(12) United States Patent
Lawler, Jr. et al.

(10) Patent No.: US 9,067,106 B1
(45) Date of Patent: Jun. 30, 2015

(54) BALL RETRIEVING RETRACTABLE CLAW

(71) Applicant: Robert Costanzo, Newington, CT (US)

(72) Inventors: George Vincent Lawler, Jr., Cromwell, CT (US); Kosty R. Costanzo, Port Charlotte, FL (US)

(73) Assignee: George Vincent Lawler, Jr., Cromwell, CT (US)

( * ) Notice: Subject to any disclaimer, the term of this patent is extended or adjusted under 35 U.S.C. 154(b) by 0 days.

(21) Appl. No.: 14/198,902

(22) Filed: Mar. 6, 2014

Related U.S. Application Data

(60) Provisional application No. 61/930,074, filed on Jan. 22, 2014.

(51) Int. Cl.
*A63B 47/02* (2006.01)
*B25J 1/04* (2006.01)

(52) U.S. Cl.
CPC ... *A63B 47/02* (2013.01); *B25J 1/04* (2013.01)

(58) Field of Classification Search
CPC .................................. A63B 47/02; B25J 1/04
USPC .................... 294/19.2, 100; 473/286; 56/332; 81/53.1, 53.11
See application file for complete search history.

(56) References Cited

U.S. PATENT DOCUMENTS

| | | | |
|---|---|---|---|
| 802,264 A * | 10/1905 | Brown | 294/19.2 |
| 3,224,781 A | 12/1965 | Hutchison | |
| 3,318,628 A | 5/1967 | White | |
| 3,698,720 A * | 10/1972 | Gudmundsen | 473/286 |
| 4,687,204 A | 8/1987 | Lempio | |
| 4,953,906 A | 9/1990 | White | |
| 5,004,240 A * | 4/1991 | Tsukamoto | 473/286 |
| 5,299,846 A | 4/1994 | Rush | |
| 5,460,366 A | 10/1995 | Pugh | |
| 5,520,389 A | 5/1996 | Furrow | |
| 5,899,511 A | 5/1999 | Dinatale | |
| 6,589,123 B2 * | 7/2003 | Schmitt | 473/286 |
| 6,719,651 B1 | 4/2004 | Newey | |
| 6,743,113 B2 | 6/2004 | Pettinga et al. | |
| 6,852,040 B1 | 2/2005 | Williams | |
| 7,645,200 B2 * | 1/2010 | Downey | 473/286 |
| 7,713,136 B1 | 5/2010 | Colucci | |
| 2002/0169030 A1 | 11/2002 | Chun-Sheng | |
| 2003/0195054 A1 * | 10/2003 | Rioux | 473/286 |
| 2007/0259731 A1 | 11/2007 | Barouh | |
| 2011/0053701 A1 | 3/2011 | Eddings | |

* cited by examiner

*Primary Examiner* — Dean Kramer
(74) *Attorney, Agent, or Firm* — McCormick, Paulding & Huber LLP

(57) ABSTRACT

An apparatus for retrieving an object: more than two claws mounted to a plunger that is movably housed within a cup, the claws extending through a lid of the cup. With the plunger at the bottom of the cup, each claw is retracted into the lid; with the plunger at the top of the cup, each claw extends beyond the lid to a ball-grasping position. At least one claw is bent and resilient. On pressing the tips of the claws against an object, the at least one claw bends apart from the other claws to admit the object between the claws, and on passing beyond a diameter of the object, the tip of the at least one claw springs back toward the other claws to capture the object between the claws.

13 Claims, 4 Drawing Sheets

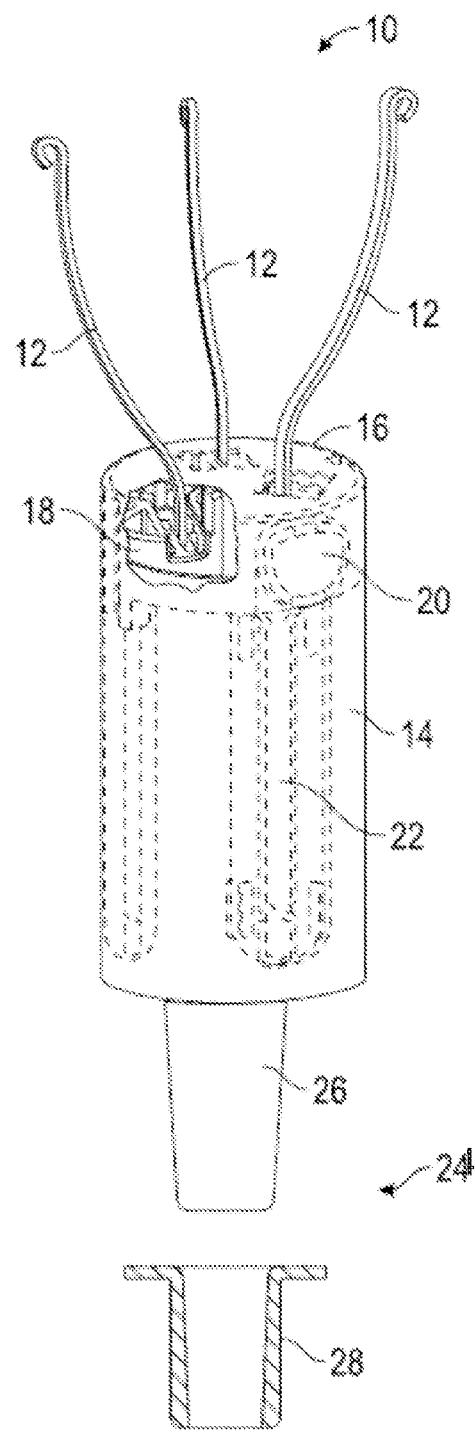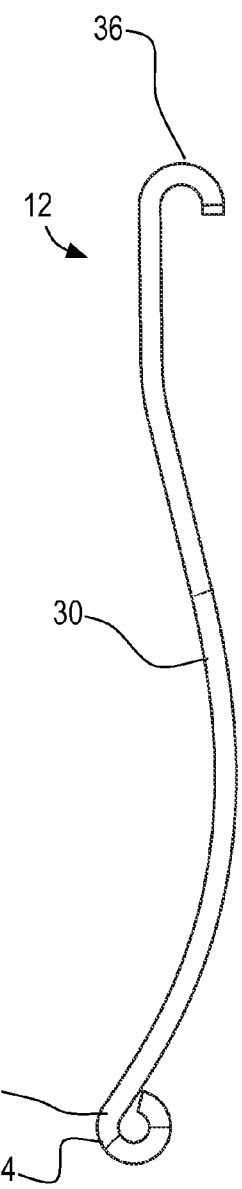
FIG. 1
FIG. 2

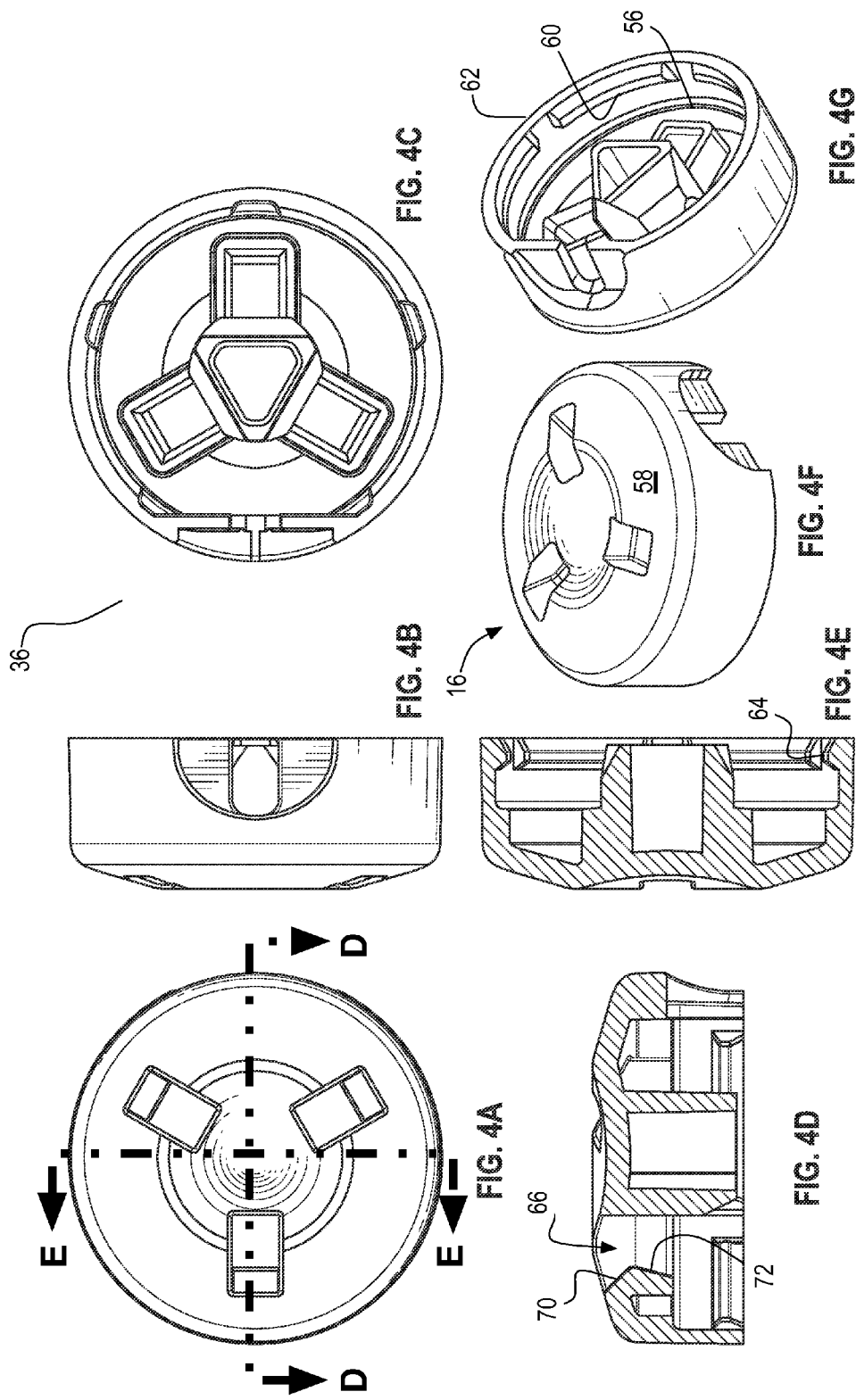

BALL RETRIEVING RETRACTABLE CLAW

CROSS REFERENCE TO RELATED APPLICATIONS

The present application is a non-provisional of U.S. Pat. App. 61/930,074 filed 22 Jan. 2014, hereby claims priority thereto under 35 U.S.C. 119(e), and incorporates herein by reference the disclosures thereof.

BACKGROUND

1. Technical Field

The present invention relates to sporting equipment and, more particularly, to golf equipment.

2. Discussion of Art

In the sport or activity of golf it is a known problem that some participants have limited mobility (e.g. find it difficult to bend down and retrieve a ball from the ground, or to stretch and retrieve a ball from under a bush) yet would like to continue in active play.

Certain apparatus have previously been proposed for resolving this problem. For example, U.S. Pat. No. 4,687,204 discloses a ball scoop that is attached by way of a bent wire to the butt or grip end of a golf club. As another example, U.S. Pat. No. 6,743,113 discloses a golf ball retriever, which is affixed to an end of a golf club shaft; the retriever includes a fitting that caps the end of the golf club shaft, a plug sized to be received within the golf club shaft, a plurality of wires secured to the plug and extending through the fitting inner bore, and a plurality of contact elements each being attached to one of the wires. A user grasps the wires to extend the wires from the golf club shaft to a position retained by engagement of the plug and fitting, wherein the wires diverge in order to receive the golf ball when pressed upon the golf ball.

BRIEF DESCRIPTION

According to the present invention, an apparatus for retrieving an object comprises a cup, a lid closing the top of the cup, a plunger movably housed within the cup, and more than two claws mounted to the plunger and extending through the lid. The cup includes means for attaching the cup to a hollow shaft, and has a wall extending from a closed bottom of the cup to an open top of the cup, with a generally vertical slot formed through the wall. The lid has a plurality of holes formed therethrough for passing the claws. The plunger has a handle that protrudes from an edge of the plunger through the slot of the cup for moving the plunger along the slot. Each of the claws has a root mounted to the plunger and has a tip extended through a corresponding one of the plurality of holes formed through the lid. Each claw is of a length such that when the handle is positioned at the bottom end of the slot of the cup, the tip of each claw is retracted within the lid, whereas when the handle is positioned at the top end of the slot, the tip of each claw extends beyond the lid to a ball-grasping position. At least one claw has a bent shape and a resilient structure, and its corresponding hole of the lid is positioned such that on pressing the tips of the claws in the ball-grasping position against a surface of an object to be retrieved, the at least one claw bends apart from the other claws to admit the object between the claws, and such that on passing beyond a diameter of the object, the tip of the at least one claw springs back toward the other claws to capture the object between the claws.

These and other objects, features and advantages of the present invention will become apparent in light of the detailed description thereof, as illustrated in the accompanying drawings.

DRAWINGS

FIG. 1 shows an apparatus for retrieving an object, according to an embodiment of the invention.

FIG. 2 shows a claw component of the apparatus shown in FIG. 1.

FIGS. 4A-4G show several views of a lid component of the apparatus shown in FIG. 1.

DETAILED DESCRIPTION OF THE DRAWINGS

Figure 3:
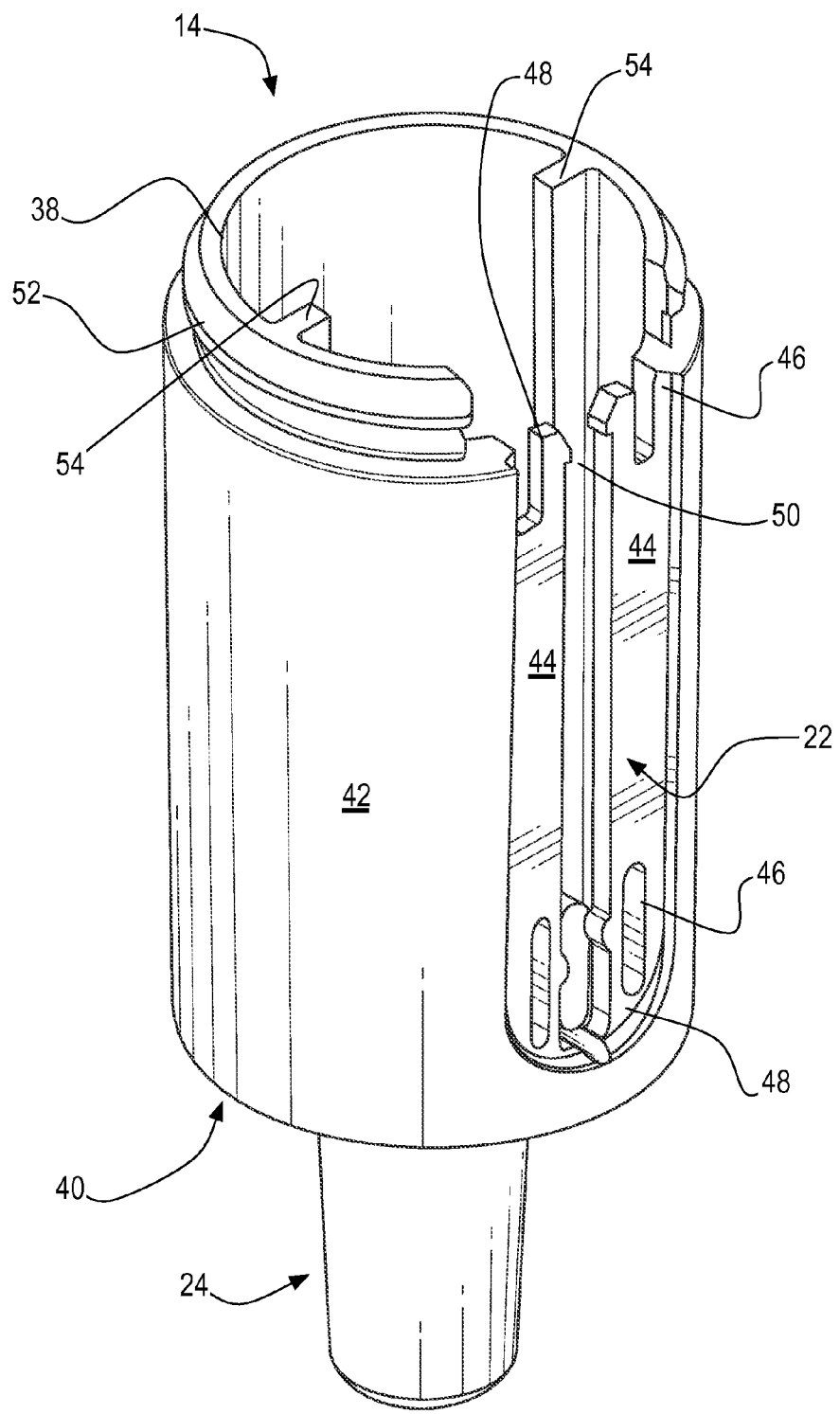
FIG. 3 shows a cup component of the apparatus shown in FIG. 1.
Figure 5D:
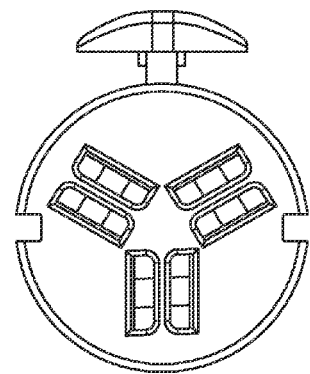
FIGS. 5A-5G show several views of a plunger component of the apparatus shown in FIG. 1.
Figure 5C:
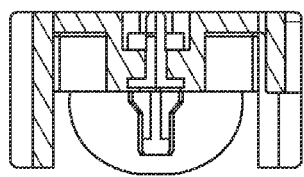
Figure 5B:
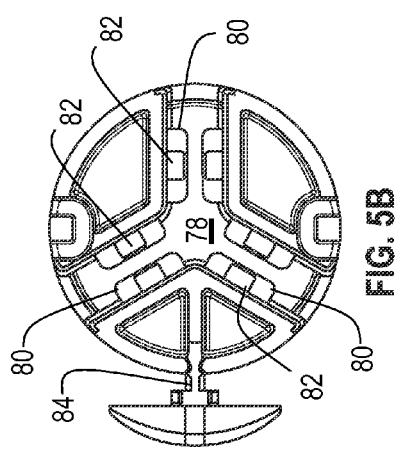
Figure 5A:
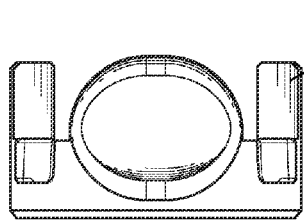
Figure 5G:
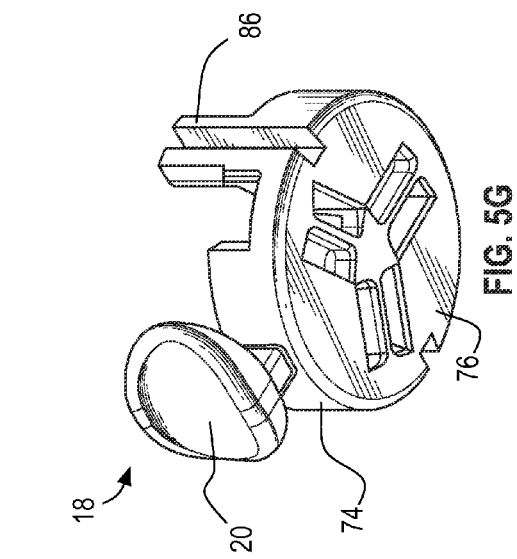
Figure 5E:
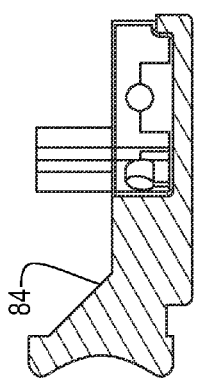
Figure 5F:
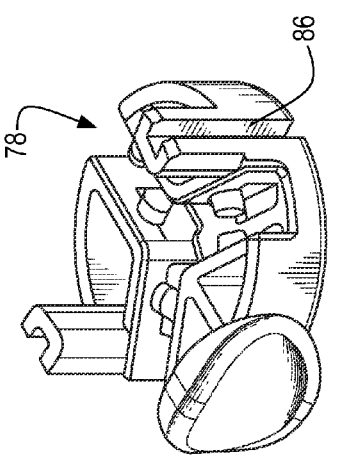

Referring to FIG. 1, an exemplary embodiment of the invention provides an apparatus 10 for retrieving an object (not shown), which object could be a golf ball. Said apparatus comprises more than two claws 12 for grasping the object. The claws are housed within a cup 14, which has its open top end covered by a lid 16. The claws extend from the cup through the lid, and can be retracted into the cup or extended from the cup by actuation of a plunger 18, which is movably mounted within the cup. The plunger can be actuated to move up and down within the cup by operation of a handle 20, which protrudes from the plunger through a slot 22 that is formed in a wall of the cup. At its bottom end, the cup has means 24 for attaching the cup to a hollow shaft.

In the embodiment shown, the means for attaching the cup to the hollow shaft comprise a conically tapered boss 26 that protrudes from the bottom of the cup for insertion into an open end of the hollow shaft. Additionally, the means for attaching the cup to the hollow shaft may further comprise a resilient bushing 28 that can be installed around the conically tapered boss for adapting the boss to fit an oversize opening. Alternative means for attaching the cup to the hollow shaft may include a threaded stud, a splined stud, a pin with cross-hole for cotter pin, or similar fastening apparatus.

FIG. 2 shows an exemplary claw 12, which has a bent body 30 that is a generally arcuate shape. In other embodiments (not shown) the claw may instead have a bent shape that is angled or jointed. The claw has a resilient structure (e.g. it is fabricated of spring steel or similar elastic material) such that it repeatedly can return to its bent shape after being flattened or straightened. At its tip 32, the claw is rounded to encourage sliding across a surface of an object to be grasped. The tip also defines a bump 34, which may be helpful for engaging a dimpled object (e.g., a golf ball). The claw has a hooked root 36, suitable for rotatably hooking onto a support pin or the like.

Referring to FIG. 3, the cup 14 has an open top end 38 and a closed bottom 40, from which protrudes the attaching means 24. The slot 22 extends from the open top end most of the way along the cup wall 42. Around the slot 22, the cup wall includes a relatively thin flange 44, which has notches 46 at its upper and lower ends that define tabs 48, which can flex away from the slot. The tabs 48 include bumps 50, which, as further discussed below, interact with the plunger handle 20 to latch the 18 plunger and claws 12 into their retracted or extended positions. Around its top end, the cup has an annular shoulder 52, which engages into the lid 16 as further discussed below. At its inner surface, the cup wall includes at least one ridge 54 that runs vertically from the top end to the bottom end of the cup. As further discussed below, the ridge interacts with a post of the plunger to prevent the plunger cocking and jamming within the cup.

FIG. 4 shows from several views the lid 16. The lid has a concave under surface 56 and an opposite slightly convex upper surface 58. The lid has a rim 60 that protrudes from the edge of the concave surface to a lip 62, which has a plurality of inward nubs 64. The nubs formed on the lip of the lid engage under the annular shoulder 52 at the top end of the cup 14, thereby snapping the lid onto the cup.

The lid 16 also includes a plurality of holes 66, each corresponding to one of the claws 12. Each of the holes formed through the lid has a radially outward surface, which comprises two generally planar segments: a lower segment 70 is angled inward from the under surface to an upper segment 72, which in turn is angled outward from the lower segment to the upper surface of the lid. The angles of the lower and upper segments 70, 72 guide the arcuate bodies of the claws 12 to spread apart in their extended positions, but also constrain the spreading of the claws so that they can grasp an object of suitable size (e.g., a golf ball).

Referring to FIG. 5, the plunger 18 is shown from several views. The plunger has a generally puck-shaped body 74 with a generally flat bottom face 76 and a complex top face 78. At its top face, the plunger has three generally radial channels for receiving the hooked roots 36 of corresponding claws 12. From its bottom face to its top face, the body of the plunger is pierced by a plurality of generally radially extending slots 80 in registry with the radial channels; each of the slots enables low-cost injection molding of a corresponding pin 82. Opposed pairs of pins are provided in each of the radial channels. Each of the pins protrudes partway across its channel for capturing the root of a claw. A gap between the pins of each pair permits twisting insertion of the root of a claw.

The handle 20 protrudes from the side of the plunger on an arm 84, which includes dents at its sides for engaging the bumps 50 that are formed on the flexible tabs 48 of the cup 14. Thus, the plunger can be releasably latched into its extended or retracted positions. At either side of the plunger body, about 90 degrees offset from the handle, an open channel 86 protrudes upward to engage slidingly with the vertical ridges 54 that are formed in the cup 14.

Referring back to FIG. 1, each claw 12 is of a length such that when the handle 20 is positioned at the bottom end of the slot 22, the tip of each claw is retracted within the lid 16, whereas when the handle is positioned at the top end of the slot, the tip of each claw extends beyond the lid to a ball-grasping position.

Accordingly, it is possible for a user of the retrieving apparatus to easily and comfortably actuate the apparatus either for use or for storage. When the apparatus is stored, the plunger and claws latch into their retracted positions, such that if the apparatus is mounted at the grip end of a golf club, it does not interfere with normal use of the club.

Although exemplary embodiments of the invention have been described with reference to attached drawings, those skilled in the art will apprehend various changes in form and detail consistent with the scope of the invention as defined by the appended claims.

What is claimed is:

1. An apparatus for retrieving an object, said apparatus comprising:
   a cup having means for attaching the cup to a hollow shaft, and having a wall extending from a closed bottom of the cup to an open top of the cup, with a generally vertical slot formed through the wall;
   a lid closing the top of the cup, and having a plurality of holes formed therethrough;
   a plunger movably housed within the cup and having a handle that protrudes from an edge of the plunger through the slot of the cup for moving the plunger along the slot; and
   more than two claws, each claw having a root mounted to the plunger and having a tip extended through a corresponding one of the plurality of holes formed through the lid,
   each claw of a length such that when the handle is positioned at the bottom end of the slot of the cup, the tip of each claw is retracted within the lid, whereas when the handle is positioned at the top end of the slot, the tip of each claw extends beyond the lid to a ball-grasping position, and
   at least one claw having a bent shape and a resilient structure, and its corresponding hole of the lid positioned such that on pressing the tips of the claws in the ball-grasping position against a surface of an object to be retrieved, the at least one claw bends apart from the other claws to admit the object between the claws, and such that on passing beyond a diameter of the object, the tip of the at least one claw springs back toward the other claws to capture the object between the claws,
   wherein the plunger includes at least one pin, and at least one claw has a root that is hooked to rotatably engage the at least one pin of the plunger.

2. The apparatus as claimed in claim 1, wherein the bent shape of the at least one claw is a generally arcuate shape.

3. The apparatus as claimed in claim 1, wherein the tip of at least one claw is rounded to slide across a surface of an object.

4. The apparatus as claimed in claim 1, wherein the tip of at least one claw includes a bump to engage a dimple of a golf ball.

5. The apparatus as claimed in claim 1, wherein each claw has a generally arcuate shape, a resilient structure, and a rounded tip with a bump to engage a dimple of a golf ball.

6. The apparatus as claimed in claim 1, wherein the plunger has a pin corresponding to each of the more than two claws, and each claw has a generally arcuate shape, a resilient structure, a rounded tip with a bump to engage a dimple of a golf ball, and a hooked root to rotatably engage its corresponding pin of the plunger.

7. An apparatus for retrieving an object, said apparatus comprising:
   a cup having means for attaching the cup to a hollow shaft, and having a wall extending from a closed bottom of the cup to an open top of the cup, with a generally vertical slot formed through the wall;
   a lid closing the top of the cup, and having a plurality of holes formed therethrough;
   a plunger movably housed within the cup and having a handle that protrudes from an edge of the plunger through the slot of the cup for moving the plunger along the slot; and
   more than two claws, each claw having a root mounted to the plunger and having a tip extended through a corresponding one of the plurality of holes formed through the lid,
   each claw of a length such that when the handle is positioned at the bottom end of the slot of the cup, the tip of each claw is retracted within the lid, whereas when the handle is positioned at the top end of the slot, the tip of each claw extends beyond the lid to a ball-grasping position, and at least one claw having a bent shape and a resilient structure, and its corresponding hole of the lid positioned such that on pressing the tips of the claws in the ball-grasping position against a surface of an object to be retrieved, the at least one claw bends apart from the other claws to admit the object between the claws, and such that on passing beyond a diameter of the object, the tip of the at least one claw springs back toward the other claws to capture the object between the claws, wherein the means for attaching the cup to the hollow shaft comprise a conically tapered boss protruding from the bottom of the cup for insertion into an open end of the hollow shaft.

8. The apparatus as claimed in claim 7, wherein the means for attaching the cup to the hollow shaft further comprise a resilient bushing installed around the conically tapered boss.

9. An apparatus for retrieving an object, said apparatus comprising:
- a cup having means for attaching the cup to a hollow shaft, and having a wall extending from a closed bottom of the cup to an open top of the cup, with a generally vertical slot formed through the wall;
- a lid closing the top of the cup, and having a plurality of holes formed therethrough;
- a plunger movably housed within the cup and having a handle that protrudes from an edge of the plunger through the slot of the cup for moving the plunger along the slot; and
- more than two claws, each claw having a root mounted to the plunger and having a tip extended through a corresponding one of the plurality of holes formed through the lid,
- each claw of a length such that when the handle is positioned at the bottom end of the slot of the cup, the tip of each claw is retracted within the lid, whereas when the handle is positioned at the top end of the slot, the tip of each claw extends beyond the lid to a ball-grasping position, and
- at least one claw having a bent shape and a resilient structure, and its corresponding hole of the lid positioned such that on pressing the tips of the claws in the ball-grasping position against a surface of an object to be retrieved, the at least one claw bends apart from the other claws to admit the object between the claws, and such that on passing beyond a diameter of the object, the tip of the at least one claw springs back toward the other claws to capture the object between the claws, wherein
- the cup has a ridge formed vertically along an inner surface of its wall at a position circumferentially offset from and parallel to the slot, and
- the plunger has a leg protruding along and receiving the ridge of the cup.

10. The apparatus as claimed in claim 9, wherein the leg of the plunger extends generally vertically along the wall of the cup and spaces the plunger apart from the lid when the handle is positioned at the top end of the slot.

11. The apparatus as claimed in claim 9, wherein the wall of the cup includes a thin flange surrounding the slot, and the flange includes notches adjacent each end of the slot, the notches defining flexible tabs of the flange, the flexible tabs having bumps for latchably engaging the handle of the plunger to retain the plunger in an extended position or in a retracted position.

12. An apparatus for retrieving an object, said apparatus comprising:
- a cup having means for attaching the cup to a hollow shaft, and having a wall extending from a closed bottom of the cup to an open top of the cup, with a generally vertical slot formed through the wall;
- a lid closing the top of the cup, and having a plurality of holes formed therethrough;
- a plunger movably housed within the cup and having a handle that protrudes from an edge of the plunger through the slot of the cup for moving the plunger along the slot; and
- more than two claws, each claw having a root mounted to the plunger and having a tip extended through a corresponding one of the plurality of holes formed through the lid,
- each claw of a length such that when the handle is positioned at the bottom end of the slot of the cup, the tip of each claw is retracted within the lid, whereas when the handle is positioned at the top end of the slot, the tip of each claw extends beyond the lid to a ball-grasping position, and
- at least one claw having a bent shape and a resilient structure, and its corresponding hole of the lid positioned such that on pressing the tips of the claws in the ball-grasping position against a surface of an object to be retrieved, the at least one claw bends apart from the other claws to admit the object between the claws, and such that on passing beyond a diameter of the object, the tip of the at least one claw springs back toward the other claws to capture the object between the claws,
- wherein the lid has a concave surface and a rim protruding from the edge of the concave surface to a lip, the lip of the rim of the lid having at least one inward protrusion, the top end of the wall of the cup having an annular groove that matingly engages with the inward protrusion of the lip of the rim of the lid.

13. An apparatus for retrieving an object, said apparatus comprising:
- a cup having means for attaching the cup to a hollow shaft, and having a wall extending from a closed bottom of the cup to an open top of the cup, with a generally vertical slot formed through the wall;
- a lid closing the top of the cup, and having a plurality of holes formed therethrough;
- a plunger movably housed within the cup and having a handle that protrudes from an edge of the plunger through the slot of the cup for moving the plunger along the slot; and
- more than two claws, each claw having a root mounted to the plunger and having a tip extended through a corresponding one of the plurality of holes formed through the lid,
- each claw of a length such that when the handle is positioned at the bottom end of the slot of the cup, the tip of each claw is retracted within the lid, whereas when the handle is positioned at the top end of the slot, the tip of each claw extends beyond the lid to a ball-grasping position, and
- at least one claw having a bent shape and a resilient structure, and its corresponding hole of the lid positioned such that on pressing the tips of the claws in the ball-grasping position against a surface of an object to be retrieved, the at least one claw bends apart from the other claws to admit the object between the claws, and such that on passing beyond a diameter of the object, the tip of the at least one claw springs back toward the other claws to capture the object between the claws,
- wherein each of the holes of the lid has a radially outward surface comprising two generally planar segments, a lower one of the segments angled inward from bottom to top and an upper one of the segments angled outward from bottom to top.

* * * * *